United States Patent [19]

Soohoo

[11] Patent Number: 4,815,851
[45] Date of Patent: Mar. 28, 1989

[54] FREQUENCY MODULATED PHASE-LOCKED STABILIZED PASSIVE RING LASER GYRO

[75] Inventor: Kie L. Soohoo, Anaheim, Calif.

[73] Assignee: Rockwell International Corporation, El Segundo, Calif.

[21] Appl. No.: 864,232

[22] Filed: May 19, 1986

[51] Int. Cl.$^4$ .................................................. G01B 9/02
[52] U.S. Cl. ......................................... 356/350; 372/94
[58] Field of Search ........................... 356/350; 372/94

[56] References Cited

U.S. PATENT DOCUMENTS

| | | |
|---|---|---|
| 3,390,606 | 7/1968 | Podgorski ............................. 356/350 |
| 4,135,822 | 1/1979 | Ezekiel .................................. 356/350 |
| 4,673,293 | 6/1987 | Sanders ................................ 356/350 |

Primary Examiner—Stephen C. Buczinski
Assistant Examiner—Linda J. Wallace
Attorney, Agent, or Firm—H. Fredrick Hamann; George A. Montanye; James F. Kirk

[57] ABSTRACT

A passive ring resonator gyroscope having an integral single piece body having first and second resonator cavities. A laser uses the first resonator cavity. The laser has a first cavity adjusting means (PZT1) responsive to a first control signal for providing a single frequency light source (F0). The second resonator cavity is a passive high Q evacuated cavity having a closed optical path tuned to resonate at substantially the light frequency of the first resonator cavity. A modulating means modulates the single frequency light source to form a frequency modulated light source having a center frequency equal to the single frequency light source (F0) and having upper and lower side bands at frequencies Fo+Fm and at F0−Fm, respectively. The frequency modulated light source is split into respective first and second frequency modulated rays. The first ray center frequency is shifted by a fixed offset frequency (F1) to form a propagating light beam (FCW) in the second resonator cavity. The second frequency modulated ray forms a counterpropagating light beam in the second resonator cavity. A cavity servo maintains the propagating light beam (FCW) in the second resonator at peak resonance and frequency shifts the second frequency modulated ray by a variable offset frequency (F2) to maintain the counterpropagating light beam (FCCW) at peak resonance.

18 Claims, 10 Drawing Sheets

FIG. 2 TOP PLAN VIEW

FIG. 3 FRONT VIEW

FIG. 4 REAR VIEW

FIG. 5 PARTIAL SECTION PARTIAL ELEVATION TAKEN ALONG LINE 5-5 OF FIG. 3

FREQUENCY MODULATED PHASE-LOCKED STABILIZED PASSIVE RING LASER GYRO

BACKGROUND OF THE INVENTION

1. Field of the Invention

The present invention relates to optical gyroscopes and more particularly to passive ring resonator gyroscopes which have bias and frequency errors resulting from mechanically or thermally induced dimensional changes.

2. Description of Prior Art

This application relates to three previously submitted applications, Ser. No. 676,322, "PASSIVE RING RESONATOR GYROSCOPE", filed 11/29/84, inventor Sanders et al; Ser. No. 701,891, "TWO SERVO LOOP PASSIVE RING LASER GYROSCOPE", filed 2/13/85, inventors SooHoo and Valle; and Ser. No., 839,292, "TWO SOURCE LASER PASSIVE RING LASER GYROSCOPE", filed 3/13/86, inverter Soo-Hoo, and all having common assignee.

The first previous application described a laser gyro having a single piece body incorporating a linear laser light source, a passive resonant cavity and which relies on three active servo loops for operation.

The second previous application described a passive laser gyroscope having a single piece body and having a single linear laser light source and a passive resonant cavity. This gyro uses first and second active servo loops for operation.

The third application describes a single body passive ring laser gyroscope having a first laser source to produce a clockwise beam and a second laser source to produce a counterclockwise beam, both beams circulating in a sealed, evacuated passive cavity within the same body.

In a passive ring resonator gyroscope, a pair of monochromatic light beams counterpropagate about a closed-loop optical path, which forms a high Q resonant optical circuit. The stability of the path length between reflective surfaces forming the closed path is critical in maintaining resonance in the passive ring resonator cavity since dimensional changes contribute to bias frequency errors. The relationship between a linear laser and a ring resonator to form a prior art passive ring resonator gyro is depicted in an article by S. EZEKIEL and S. R. BALSAMO titled "A Passive Ring Laser Gyroscope", *Applied Physics Letters*, Vol. 30, No. 9, May 1, 1977, pg. 478–480. (NOTE: Usually a resonator is conceived as a linear or standing wave resonator in which the light completes an optical round trip by reflecting off a mirror and retracing its path. These forward and backward waves create a standing wave in the cavity. In a ring resonator, the light completes an optical round trip without retracing its path and hence the path encloses an area as shown in Ezekiel's paper.) For a description of lasers and resonators refer to: Yariv, A., QUANTUM ELECTRONICS (John Wiley & Sons, 1975) or Sargent, M., et. al., LASER PHYSICS (Addison-Wesley Pub., 1974).

In the passive ring resonator, such as that described in the EZEKIEL reference, the two beams, traveling in opposite directions around the closed-loop optical path, are injected into the passive ring resonator from a single frequency light source. As the ring resonator gyroscope cavity rotates in inertial space, the two counterpropagating beams travel unequal path lengths. This path difference, due to rotation in inertial space, gives rise to a relative frequency difference (Sagnac effect) between the two counterpropagating beams. (NOTE: A ring resonator, as opposed to a linear resonator, can exhibit the Sagnac effect and detect inertial rotation.) E. J. Post, "Sagnac Effect", *Review of Modern Physics*, Vol. 39, No. 2, April 1967, p. 475–493.

The relative frequency difference is detected as a changing interference fringe pattern which is then electronically interpreted to indicate the direction and inertial rate of rotation of the passive gyro about the gyro's sensitive axis. The sensitive axis of the gyro is along the direction normal to the plane of the passive resonator.

The single frequency light source for the passive resonator is typically an external linear laser. *Spectra Physics Inc.* of Sunnyvale, CA. produces stabilized lasers with the required characteristics.

It is known that bias errors in the detected signal of a ring resonator gyro result from dimensional changes in the laser and in the passive ring resonator. Bias errors also result from Fresnel Drag; these errors arise from the presence of gases (e.g. air) in the path of the counterpropagating beams in the resonator. Bias errors are typically characterized as a frequency difference between the two beams which is not related to the rotation rate. Bias errors are sometimes detected as a frequency difference in the absence of rotation or as post calibration changes in the frequency difference for a specific absolute inertial rotation rate.

The Passive Ring Resonator Gyroscope of the type described in the EZEKIEL reference is typically constructed by placing optical elements, such as mirrors, beamsplitters, etc. on an optical bench. The location, spacing and geometrical relationships between the elements of the gyro function to enhance the passive ring resonator gyroscope's sensitivity and stability. Experimental passive ring resonator gyroscopes typically have path lengths of a few meters making them unsuitable for use as a navigational instrument. The large size of prior art passive ring resonator gyroscopes, such as that characterized in the EZEKIEL reference, also contributes to the likelihood of bias errors due to mechanical coupling and mechanical drift of the optical elements in response to physical and thermal forces acting on the laser and on the optical table or bench.

SUMMARY OF THE INVENTION

The objective of this invention is to provide a phase locked passive ring resonator gyro suitable for use as a navigational instrument having reduced bias errors and bias error sensitivity while having substantially enhanced stability and sensitivity. This is accomplished by constructing a gyro having a single source laser and a ring resonator within a single housing or one piece body in which the total resonator path length is substantially below a half meter.

Another objective of this invention is to provide a single source passive ring laser gyroscope using two phase locked tracking servos for peaking the intensity of the CW (clockwise) and CCW (counterclockwise) propagating light beams in the passive cavity.

Another objective of the invention is to change the passive cavity's path length with a control signal to achieve resonance locking of the cavity to the center frequency of the linear laser without the need for periodic AC modulation of the passive cavity's path length.

A particular embodiment of this innovative passive ring resonator gyroscope has a single piece body, typically fabricated from a block of glass ceramic material such as ZERODUR®, (a trademark of the JENA$^{ER}$ GLASSWERK SCHOTT & GEN. of MAINZ, GERMANY), which forms a fixed reference frame for all required optical elements, including first and second resonator cavities. A laser means is composed of a linear or "L" shaped laser that uses the first cavity. This laser, when operated with suitable excitation, functions as a linear laser providing a source of single mode $TEM_{oo}$, single frequency light for the third resonator cavity.

In a more particular alternative embodiment, the laser means first resonator cavity has a transmitting optical port for transmitting stabilized single frequency light to the second resonator cavity. The internal body-mounted reflective surfaces are coupled to and mechanically spaced by the single piece body. A gain medium, such as a Helium Neon gas mixture is contained in the first resonator cavity but the second cavity is evacuated.

A means for exciting the gain medium, including a power source, to induce lasing in the first resonator cavity is provided. The output of the single frequency light sources is directed through at least one transmitting optical port of each of the first and second resonators.

The second resonator cavity and its reflective elements form a passive high Q cavity having a closed optical path tuned to resonate at substantially the same frequency as the first resonator cavity. Means are provided for modulating the frequency of the light source and means are provided for splitting this source into first and second rays and coupling the first and second rays into the second passive resonator cavity, thereby forming CW and CCW light beams in the second resonator. These means are implemented using conventional beamsplitters, mirrors, and lenses.

The second resonator cavity is oriented and dimensioned in relation to the first and second resonator cavities to have substantially equivalent optical path length changes in response to any induced body dimensional changes.

Bias errors are diminished since the passive ring resonator is a passive device and has no internal excitation to frequency shift the cavity resonances. Bias errors due to axial gas flow or Fresnel drag is eliminated since the second resonator is evacuated. Taken together, these features form a gyroscope with increased stability and reduced bias errors.

A cavity servo means controls the resonant frequency of the laser light source. The cavity servo means has a servo loop that locks the first laser's single frequency light source relative to the FCW resonance. The cavity servo loop is synchronized with a first oscillator that frequency modulates light leaving the laser via an electro-optic modulator at a frequency Fm (typically 10 MHz). The first oscillator also provides a reference signal to a first and second phase-sensitive detector to obtain a demodulated error signal for integration. The integrated error signal from an integrator provides a second cavity path length control signal for the resonator. The first servo means enables the first cavity to track the resonant frequency of the second resonator's FCW beam.

The first cavity linear laser has a first cavity path length adjusting means such as a piezoelectric transducer responsive to the first cavity path length control signal for shifting the resonant frequency of the first cavity. The first cavity path length adjusting means shifts the frequency of the single frequency light source in response to the integrated phase locked error signal applied to the PZT to maximize the intensity of the second resonator CW beam. The frequency of the CW beam is upshifted by an acousto-optic modulator (AO1) driven by a reference oscillator before it is injected into the second resonator.

A second servo is provided for frequency shifting the FCCW beam in the second cavity as it enters the second resonator to form the CCW beam. The second servo means is also referenced to the first oscillator. A (Fm) frequency modulated light source is up shifted in frequency by an acousto-optic coupler (AO2) driven by a voltage controlled oscillator (VCO). The VCO adjusts its output frequency in response to a second servo control signal and adds enough of a frequency increase to the Fm modulated laser light source to shift the center frequency of the FCCW beam entering the second cavity to the second cavity (passive resonator) line width resonant point. A portion of the CCW beam is extracted from the resonator and a photodetector responds to the beat signal at the frequency of the Fm signal. The Fm signal thus extracted is coupled to a second phase sensitive detector, also referenced to the first oscillator. If the upshifted frequency modulated light source, FCCW, is above or below the line center of the CCW cavity resonance, the second phase sensitive detector develops an error signal having a magnitude related to the CCW frequency error and a polarity related to the position of the error above or below the cavity's CCW peak resonance.

In this embodiment, a means for detecting the frequency difference between a clockwise upshift oscillator and a counterclockwise VCO upshift oscillator provides a signal representing a measure of the input body rate.

DESCRIPTION OF THE PREFERRED EMBODIMENT

Figure 1:
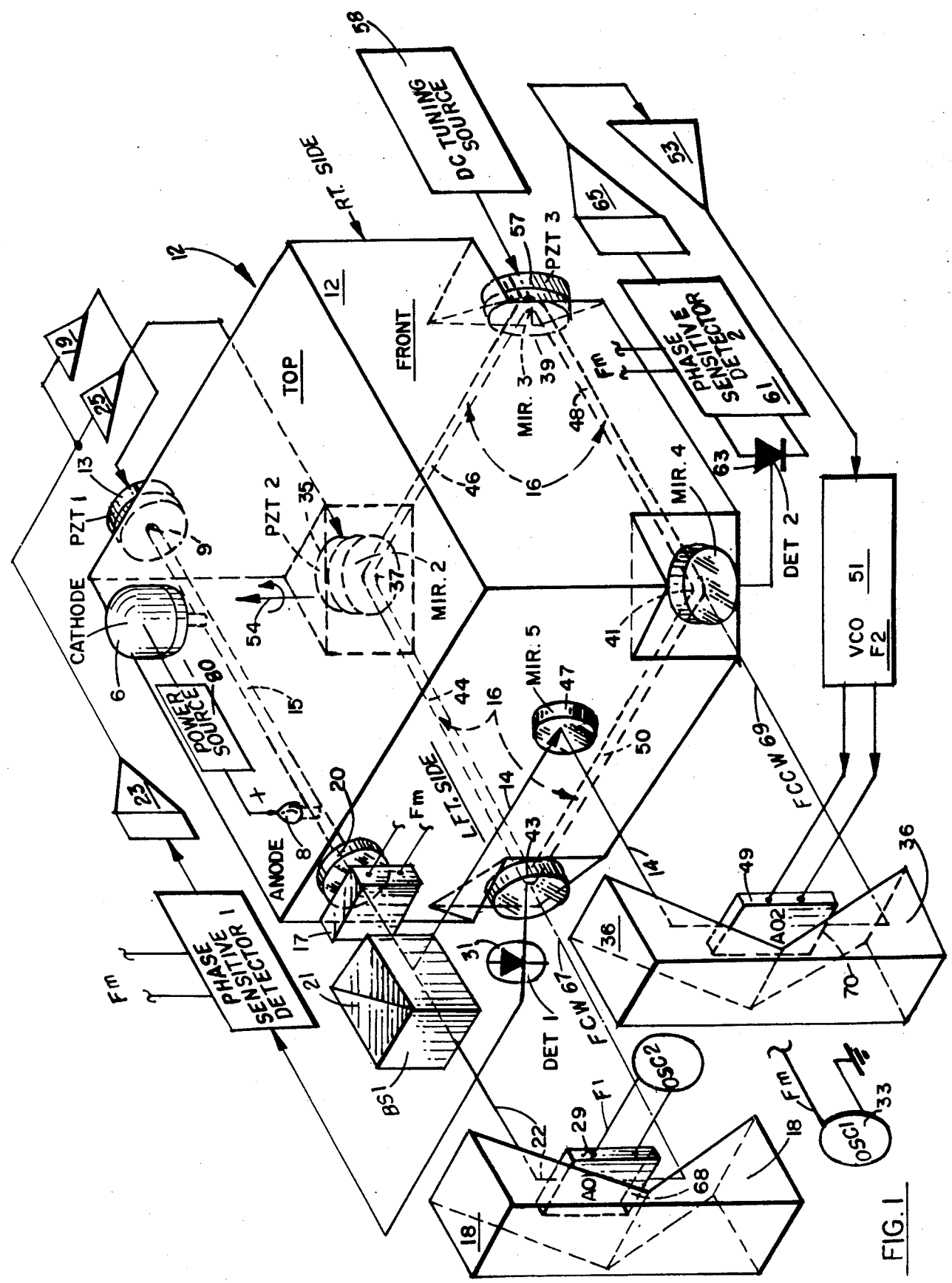
FIG. 1 is a prospective view of the phase locked passive ring resonator gyroscope.
Figure 2:
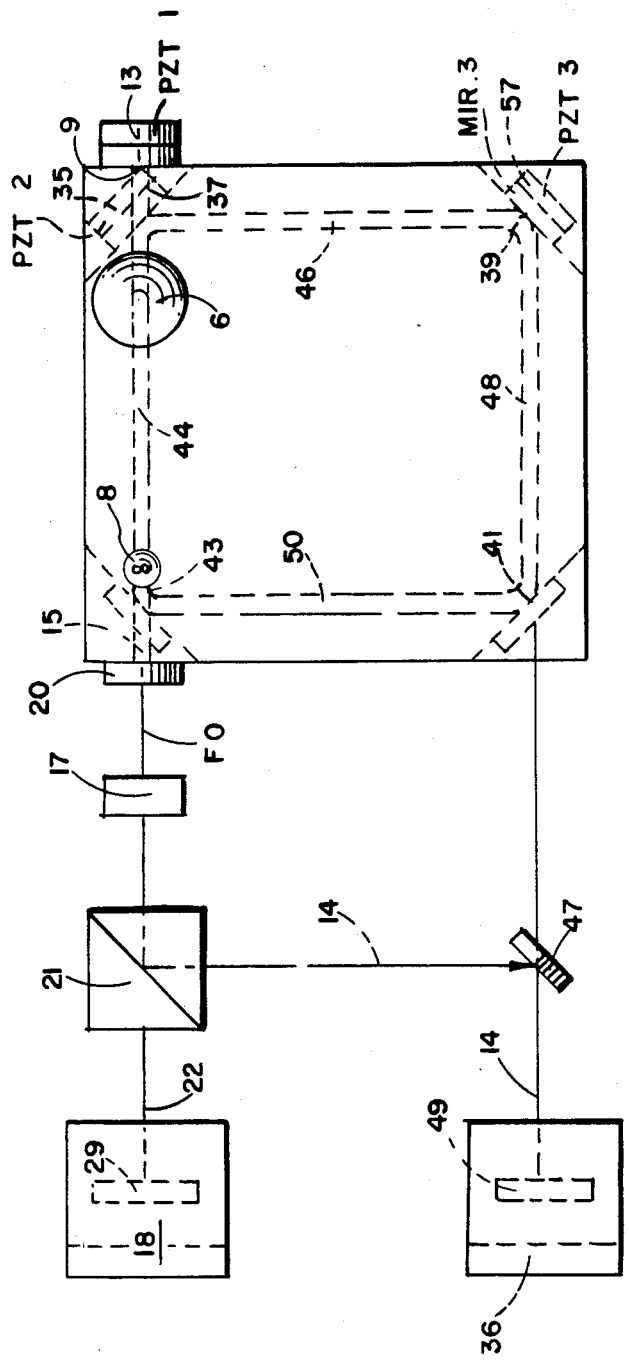
FIG. 2 is a top planar view of the two source passive ring resonator gyroscope 10 of FIG. 1 showing the first and second resonator cavities in phantom. Left and right partially transmissive mirrors 43, 41 represent first and second partially transmissive and receiving ports.

Referring now to FIG. 1, an embodiment of the invention phase detector passive ring resonator gyroscope 10 is depicted having a single piece body 12 having integral first, and second resonator cavities 15, 16. The term "integral" is meant to convey the idea that the body 12 is formed from one homogeneous piece of material such as ZERODUR. The top layer has a first cavity that serves as a linear laser. The output of the linear laser is not influenced by inertial rate inputs to the gyroscope.

The first laser means (cavity 15) is shown sourcing single frequency light at frequency Fo through the first resonator partially transmissive mirror 20 to E0 (electro-optic modulator) 17. The beam is frequency modulated by E0 17 and at frequency +/−Fm and passes to beamsplitter 21 to form first and second frequency modulated rays 22, 14, respectively.

A first oscillator, OSC1, 33 provides a sinusoidal reference signal at a frequency Fm (typically 50 MHz) to E0 17 and as a reference signal to PSD1 27 and PSD2 61 (Phase Sensitive Detector).

The E0 device is typically a phase modulator device obtained from a company such as LASERMETRICS, Electro-Optics Div. at 196 Coolidge Ave., Englewood, NJ 07631, or one such as Model 10-P-22-3-2-2.5 obtained from QUANTUM TECHNOLOGY, INC. of 2620 Iroquois Ave., Sanford, Fla. 32771.

The E0 17 frequency modulates light from laser 15 to add frequency side bands at (Fo−Fm) and (Fo+Fm) where Fo is the laser center frequency and where Fm is the frequency output of OSC1 33.

Beamsteering optics, such as first prism 18 couples the first frequency modulated ray as beam 22 through AO1 (acousto-optic modulator) 29. AO1 is a frequency shifter driven by OSC2, 45, a sinusoidal oscillator typically operating at a second reference frequency in the range of from 50 MHz to 80 MHz. The AO1 device is structured to upshift the frequency of the first frequency modulated ray 22 to a frequency F1 higher than that of the first frequency modulated ray.

Figure 7:
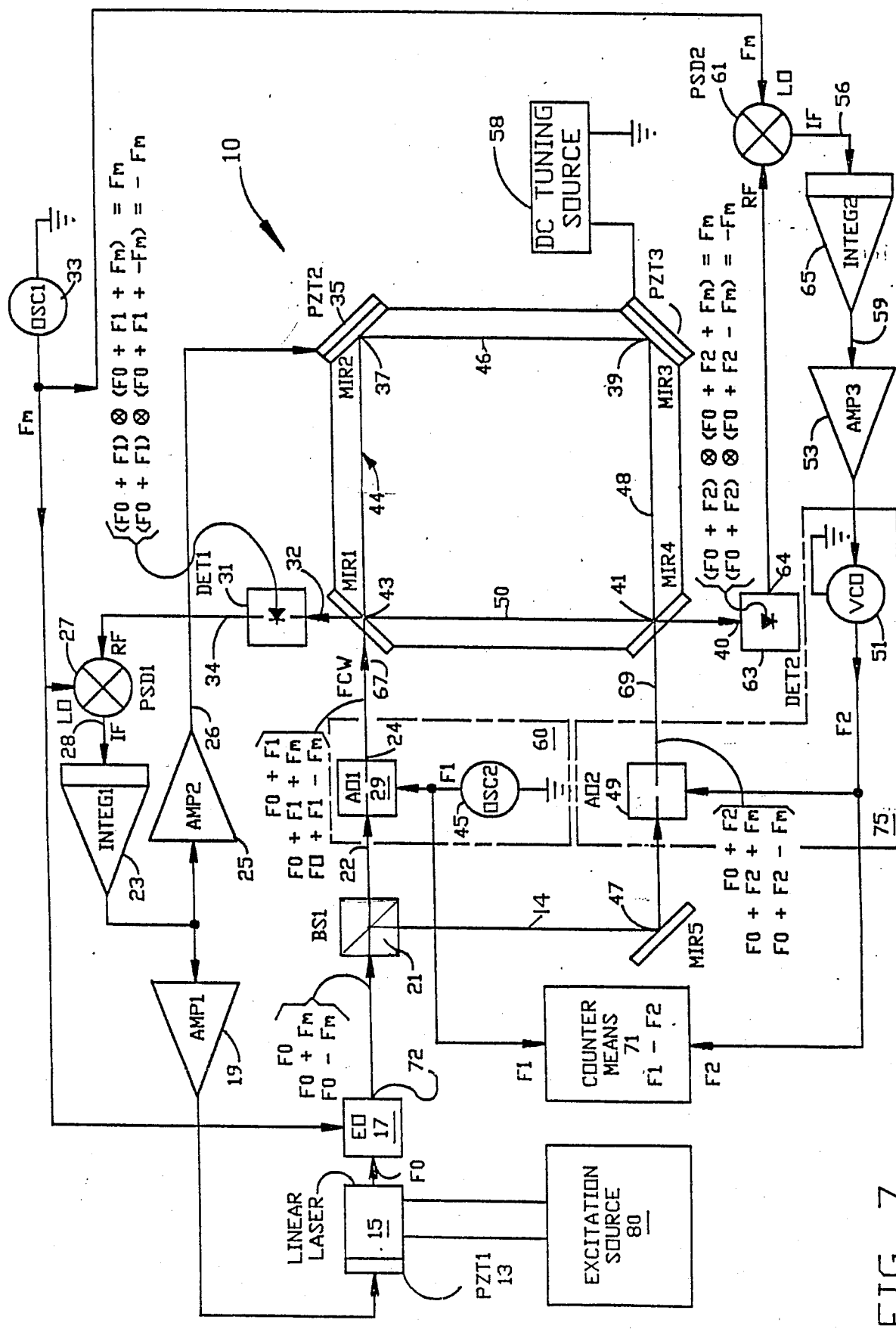
FIG. 7 is a combination schematic and block diagram of the associated electronics and optical elements of the phase locked passive ring resonator gyroscope using two servo control loops.
Figure 8:
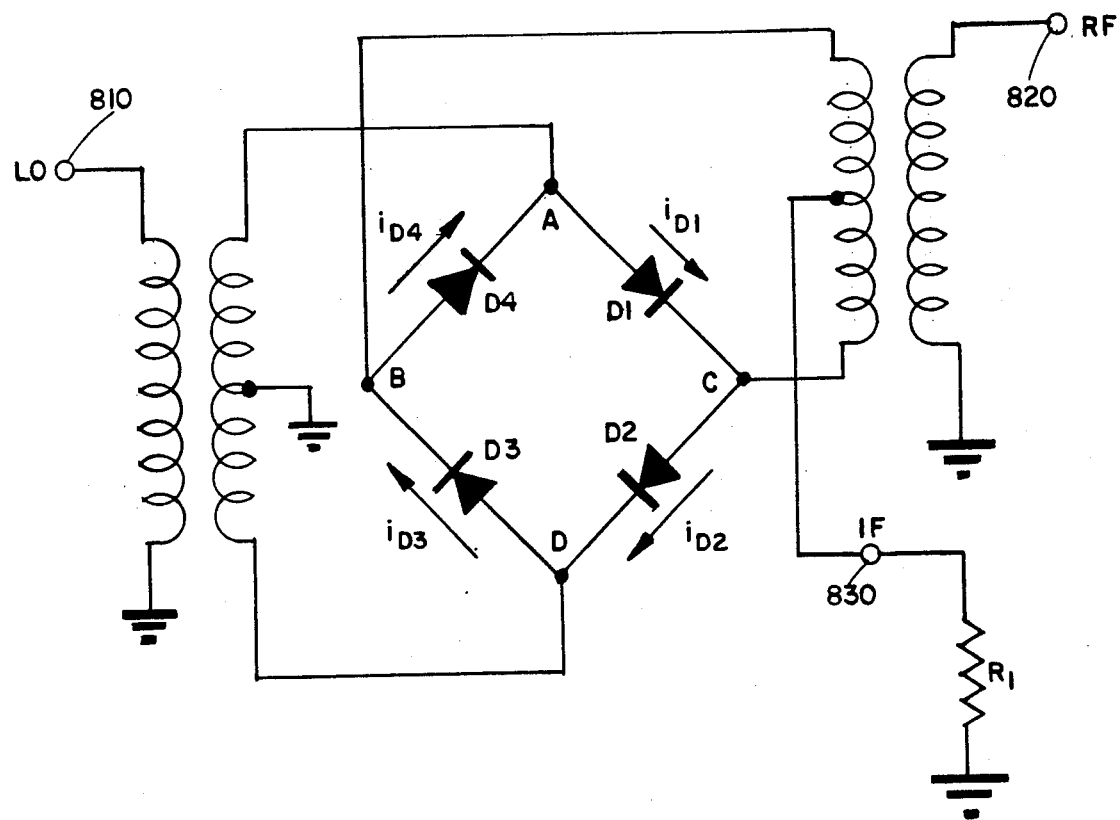
FIG. 8 is a schematic of a phase sensitive detector.

FIG. 8 is a schematic of a PSD (phase sensitive detector) such as PSD1 27 and PSD2 61. FIG. 8 shows the structure of a PSD to be a passive device. The circuit of FIG. 8 is a type referred to as a double balanced mixer. The PSD1 and PSD2 mixers 27, 61 of FIG. 7, respectively, operate as phase-sensitive detectors in applications where the frequency of signal applied to the L0 terminal 810 is the same as the frequency of the signal applied to the RF terminal 820. The PSD1 and PSD2 mixers 27, 61 are typically commercial components such as the OAD-6 from the MINI-CIRCUITS COMPANY at P.O. Box 166, Brooklyn, NY 11235. A further discussion of the operation of balanced mixers is found in an article entitled "Mixers As Phase Detectors", RF SIGNAL PROCESSING COMPONENTS, by the Watkins-Johnson Company, 1983/84, p. 605–631.

The L0 (local oscillator) terminal 810 is driven by a reference signal such as Fm from OSC1, 33 as shown in FIG. 7. The RF (radio frequency) terminal 820 typically receives a signal for detection such as the output signals from DET 1 (detector 1) 31 on signal path 34 or from DET2 63 via signal output 64. The output signal from a phase sensitive detector is fed from the IF terminal 830 to load R1. The signal at IF terminal 830 is filtered and typically has a zero volt value where the frequency of the signal at the L0 terminal 810 is the same as the frequency of the signal at the RF terminal 820 and where the phase difference is zero degrees. With a fixed frequency signal, such as Fm, present at terminal 810 and with a fixed frequency input signal of the same frequency present at the RF input terminal 820 the IF port will output a DC signal related to the phase of the L0 and RF signals. A DC output signal develops at terminal 830 of one polarity for an input RF signal having the same phase relationship as that of the L0 signal; an opposite polarity signal will result at the IF terminal 830 for an input RF signal having an opposite phase relationship with that of the L0 signal.

Figure 11A:
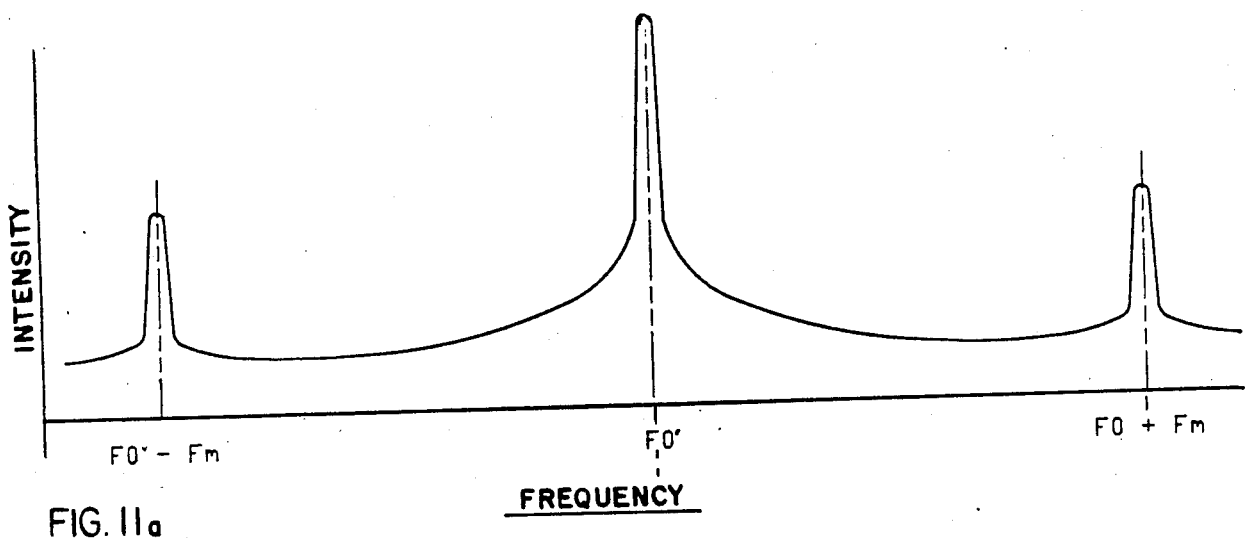
FIG. 11a shows a wave form that represents the spectral amplitude characteristic or intensity of a laser source that is frequency-modulated over a range of from (Fo−Fm) to (Of+Fm), where Fo is the laser center frequency.
Figure 11B:
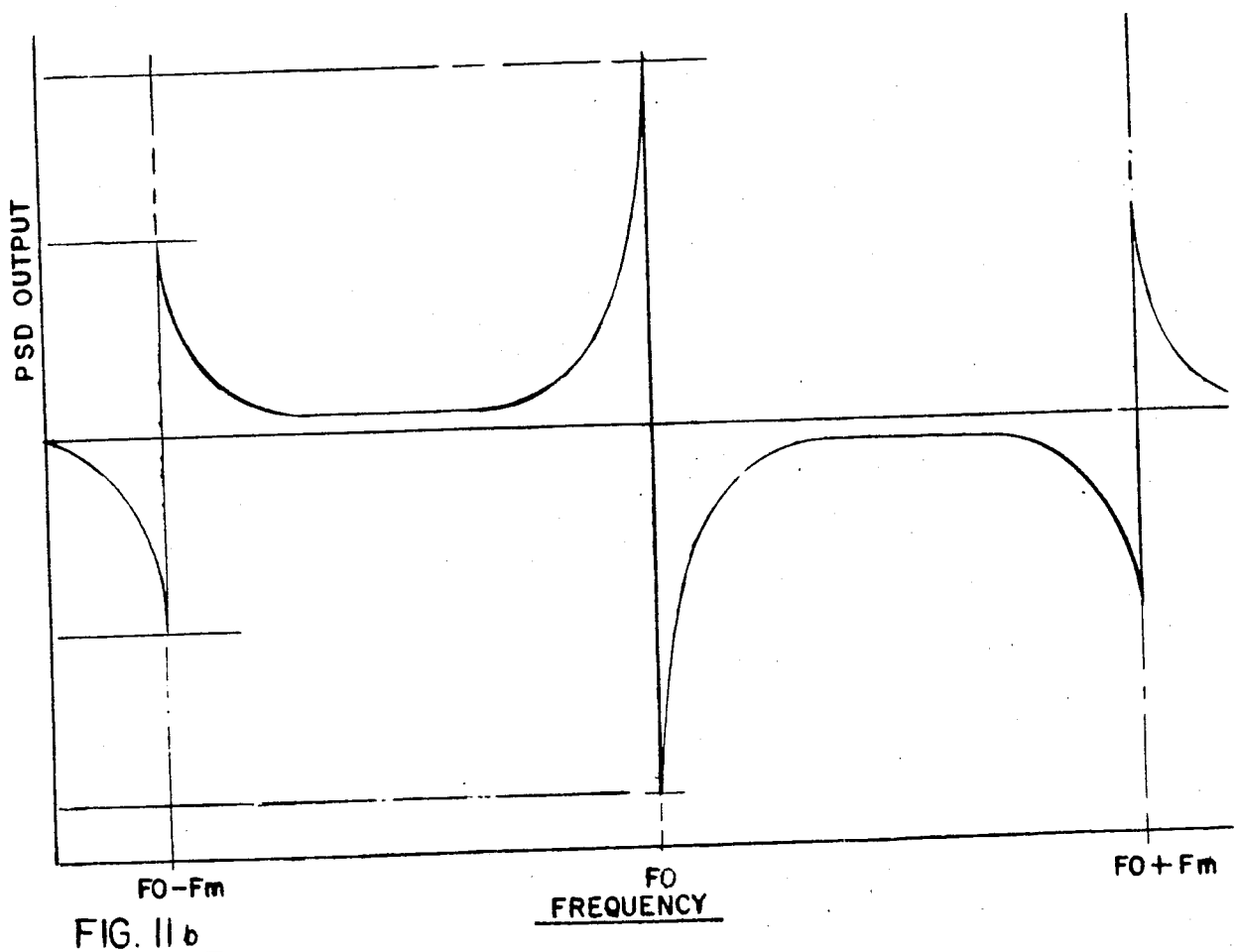
FIG. 11b shows a wave form represents the output voltage response from a phase sensitive detector as the laser source is tuned over a range extending from (Fo−Fm) to (Fo+Fm) while the passive resonator is tuned to resonate at a relatively fixed frequency Fo.

The waveform in FIG. 11a represents the spectral content of light 32 and 40 incident on DET1 31 and DET2 63 with the detectors being located as shown in FIG. 7. The upper waveform of FIG. 11 is obtainable by monitoring the input beams 32 and 40 with a spectrum analyzer. The waveform of FIG. 11b depicts the signal response of PSD1 and PSD2 at their respective IF terminals 830 in FIG. 8 or such as 28, 56 in FIG. 7, as the center frequency of the laser is gradually tuned over a frequency range extending from below (Fo−Fm) to a high frequency of (Fo+Fm) and while leaving the spectral feature, in this case, the resonator cavity 16 having a fixed center frequency at F0.

Referring again to FIG. 1 and to FIG. 7, BS1 21 splits the frequency modulated light source into first and second frequency modulated rays 22, 14 respectively. The first frequency modulated ray 22 passes to AO1, 29. AO1 aperture 68 acts as a propagating beam source to provide a propagating beam 67. Beam 22 is upshifted in frequency by AO1, 29 to form the propagating beam 67. Propagating beam 67 is directed to partially transmissive mirror MIR1, 43. The portion of the propagating beam 43 that passes through MIR1 into the second resonator cavity forms the propagating light beam (FWC) within the second resonator cavity.

The second frequency modulated ray 14 is first reflected by MIR5, 47 to AO2, 49. Ray 14 is upshifted in frequency by A02. Aperture 70 of A02 serves as a counterpropagating beam source to provide a counterpropagating beam 69. FCCW within the second resonator cavity counterpropagating light beam. directed to partially transmissive mirror MIR4, 41. The portion of the counter propagating beam 69 that passes through MIR4 forms the counterpropagating light beam FCCW within the second resonator cavity. Counterpropagating beam 69 is a source for the counterclockwise light beam, FCCW as it passes through MIR4, a partially transmissive mirror 41. The. A02 device 49 upshifts the frequency of ray 14 by F2 Hertz to form the couterpropagating beam 69 that enters cavity 16 via MIR4, at 41.

Acousto-optic device A02 49 and VCO 51 in combination represent a means responsive to a second frequency modulated ray for frequency shifting the second frequency modulated ray in response to a second control signal from the output of AMP3, 53.

Figure 3:
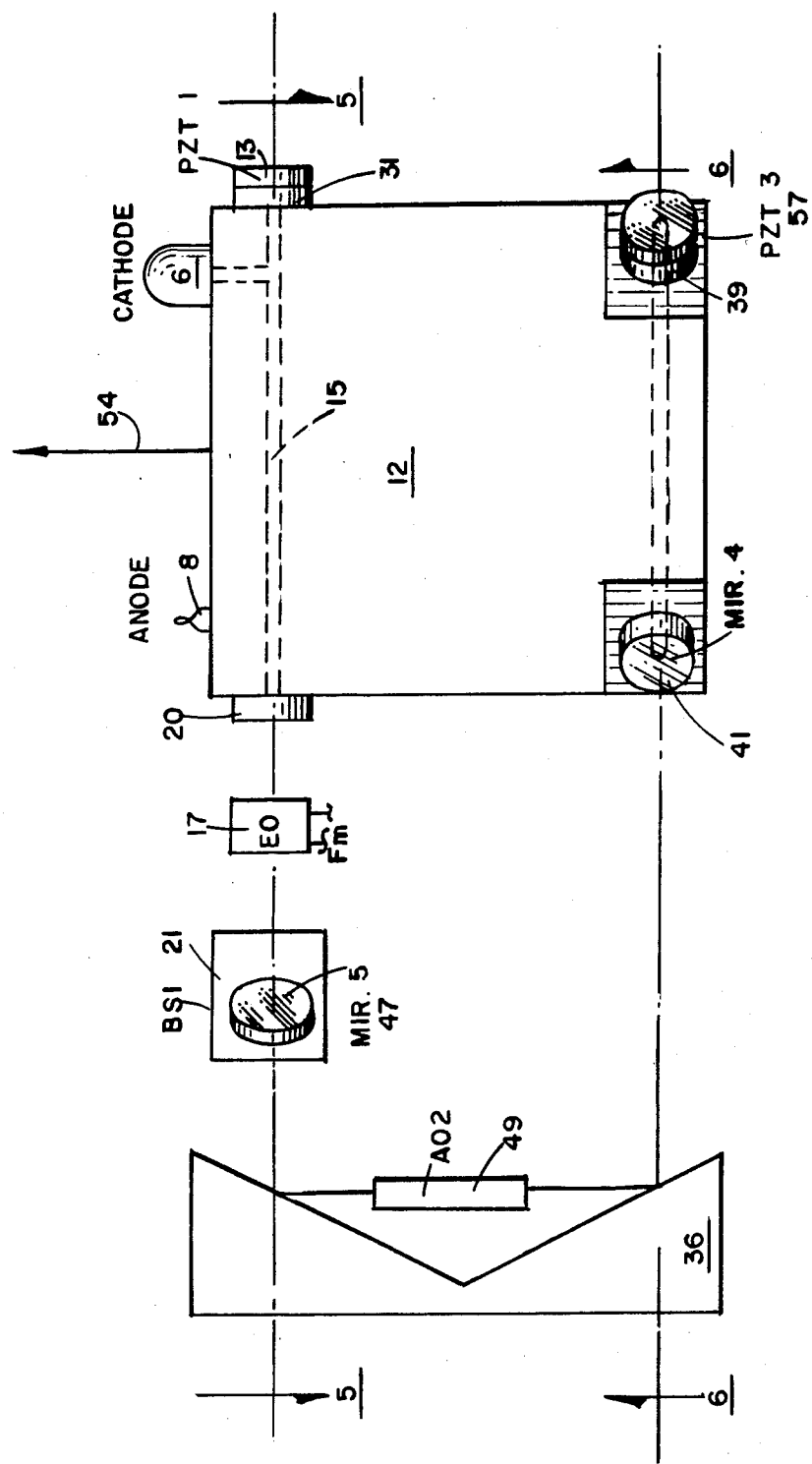
FIG. 3 is a front view of the phase locked passive ring resonator gyroscope body.
Figure 4:
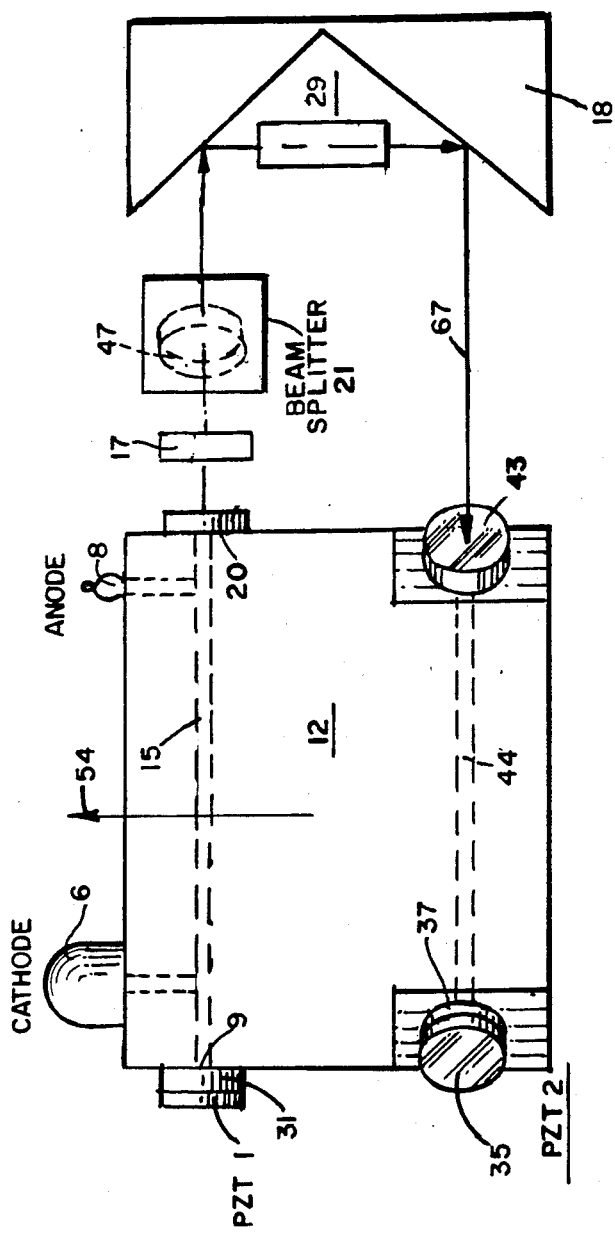
FIG. 4 is a rear view of the phase locked passive ring resonator gyroscope body.

The second resonator cavity 16 is a passive high Q evacuated cavity having a closed optical path with first, second, third, and fourth segments, 44, 46, 48, 50 tuned in combination to resonate at a frequency derived from the first resonator cavity. The sensitive axis, characterized by Vector 54, and shown in FIG. 3 and FIG. 4, is essentially normal to the plane of the closed second optical path established by the plane of segments 44, 46, 48, 50.

Part of the propagating beam is reflected off the cavity 16 at MIR1 43 and is focused on output detector 31 at DET1 receiving aperture 32. Detector DET1 31 and DET2 63 are typically silicon photodiode amplifier assemblies.

First detector 31 provides a detected FCW signal on signal line 34 to the RF input of PSD1 27. PSD1 provides a positive or negative phase error signal on signal line 28 to INTEG1 23 for integration. INTEG1 provides a first phase control signal on signal line 38 to the inputs of AMP1 19 and AMP2 25. AMP1 conditions the phase control signal and provides drive signal to PZT1 13 to shift the frequency of linear laser 15 in a direction that will drive the phase error signal on signal line 28 to zero volts.

Second detector 63 provides a detected FCCW signal on signal line 64 to the RF input of PSD2 61. PSD2 provides a positive or negative phase error signal on signal line 56 to INTEG2 65 for integration. INTEG2 65 provides a second phase control signal on signal line 59 to the inputs of AMP3 53. AMP3 53 conditions the phase control signal and provides drive signal to VCO 51 which changes the frequency that the A02, 49 shifts the FCCW beam in a direction that will drive the phase error signal on signal line 56 to zero volts.

These elements represent in combination, a cavity servo means responsive to the first phase error signal. They provide control signals to the first laser transducer PZT1 to control the resonant frequency of the first single frequency light sources F0. The first single frequency light source is tuned to control and maintain the clockwise propagating (FCW) light beam in the second resonator at peak resonance.

The second single frequency light source is tuned to control and maintain the counterpropagating light beam (FCCW) at peak resonance.

OSC2 45, represents a second reference oscillator that operates in combination with AO1, 29 as shown within phantom block 60 to form a means for shifting the center frequency of the first frequency modulated ray 22 by a fixed offset frequency F1. VCO 51 is the oscillator that operates in combination with A02, 49, as shown in phantom block 75, to shift a ray 69 into peak resonance of the CCW modulated beam.

Output counter means 71 is provided for measuring and outputting the frequency difference between said fixed offset frequency and said variable offset frequency. The measured frequency difference representing the difference in frequency due to an input gyro body rate about said sensitive axis increased by the fixed frequency of the fixed offset frequency. Output counter means 71 is typically a counter such as a HP3335 by *Hewlett Packard* for use in a laboratory, but in alternative product designs, the counter would be fabricated from conventional high speed logic circuit elements such as MECL or ECL logic by MOTOROLA suitable for use at frequencies at and above F1, the frequency of the reference signal generator (to the AO).

The first partially transmissive and receiving port 43 is characterized to receive and pass a portion of the propagating beam 67 into the second resonator cavity 16 to form the propagating light beam (FCW).

The second partially transmissive and receiving optical port 41 is characterized to receive and pass the counterclockwise beam 69 into the second resonator cavity 16 to form a counterpropagating light beam (FCCW).

PZT2 and PZT3 35, 57 shown in FIG. 7 represent piezoelectric transducers. PZT2 and PZT3 each function as an electromechanical transducer, attached to reflective surfaces 37, 39 so as to modulate the second resonator's optical path length to maintain the propagating light FCW at peak resonance within cavity 16. PZT2, 35 is a piezo-electric transducer attached to a mirrored surface, that represents a dynamic path length adjusting means for adjusting the optical path length of the second resonator cavity and has an input terminal coupled via a signal line 26 to the output of AMP2. PZT2 is adjusted, by the first control signal from first integrator INTEG1, 23 via the output 26 of AMP2, 25 for adjusting the optical path length of the second resonator cavity 16 to maintain the propagating beam FWC at peak resonance.

PZT3, 57 is a static optical path length adjusting means that provides an initial coarse adjustment for the cavity 16. PZT3, 57 is adjusted by adjusting the output voltage of DC TUNING SOURCE 58.

The first detector 31 receives a large portion of the FCW light beam reflected off the first partially transmissive and receiving port MIR1, 43.

The second cavity detector 63 receives a large portion of the counterpropagating light beam FCCW reflected off the second partially transmissive and receiving port MIR4, 41.

Figure 10A:
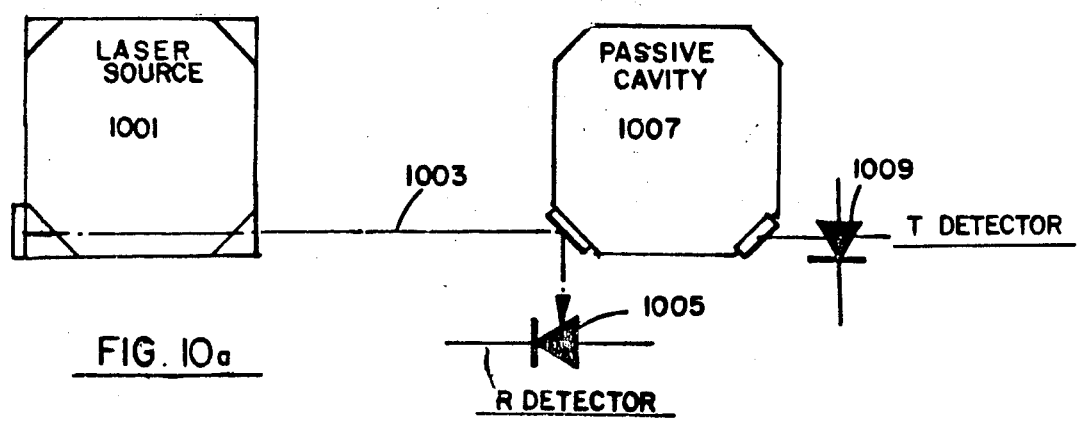
FIG. 10a shows the relative position of two detector diodes in relation to a laser source on the left and a passive cavity on the right.
Figure 10B:
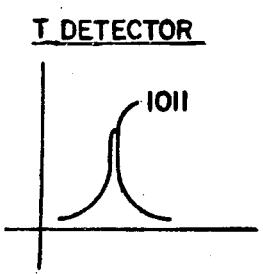
FIG. 10b shows the response characteristic of the rightmost detector.
Figure 10C:
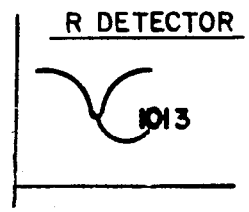
FIG. 10c shows the response characteristic of the lower detector.

Mirrors 43 and 41 have reflective surfaces positioned to direct the reflected incident beams to their respective detectors 31 and 63. The intensity of the light striking detector 31 or 63 has a high background level that dips as the resonant cavity 16 achieves resonance in response to a shift in frequency of the respective laser source. FIG. 10a characterizes a laser source directing a beam at a representative port with a portion of the beam being reflected to a detector such as detector 63. FIG. 10b depicts a peak response to incident light from detector 1009. FIG. 10c shows a dip in the background of the light intensity 1013 striking the detector such as 1005 as the laser source at 1001 is tuned to the resonance point of the passive cavity 1007.

Conversely, detector 63 senses light sourced from resonator cavity 16 via second partially transmissive port MIR4, mirror 41, to detector receiving aperture 40. The background light including signal information incident at aperture 40 dips to a minimum as the cavity is tuned to resonance.

Figure 9:
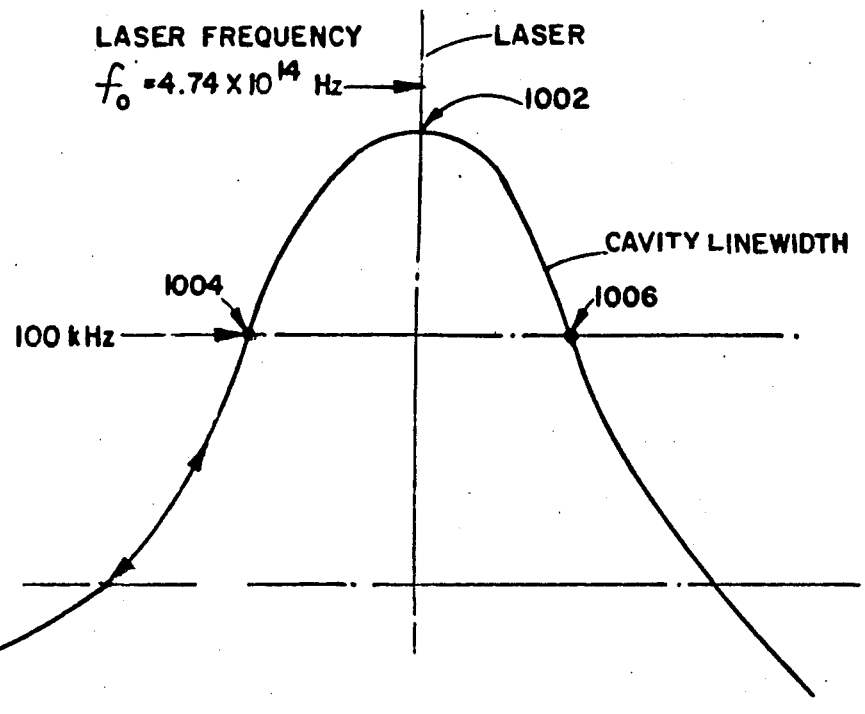
FIG. 9 shows a waveform depicting the response characteristic and center frequency of a passive resonator and depicting the center frequency of a HeNe laser.

FIG. 9 depicts the pass band of a typical passive cavity having a resonance peak at 1002. The approximate frequency spread between reference 1004 and 1006 represents a typical frequency range between the half-power points and is included in FIG. 9 along with the indicated laser center frequency, to provide the reader with a visual appreciation of the "Q" of the second resonator. The phrase "frequency stabilization" is understood to mean phase sensitive detecting and is also meant to include the principle of servo locking the laser output to the intensity peak of the passive cavity.

A HeNe laser typically has an instantaneous line width of less than one Hz but the operating frequency is subject to considerable jitter.

The dip represented by FIG. 10c would also typically have half-power points separated by 100 kHz. Typically, a HeNe input laser would have its output at $4.74 \times 10^{14}$ Hz injected along path 1003 into the passive cavity 1007.

Figure 6:
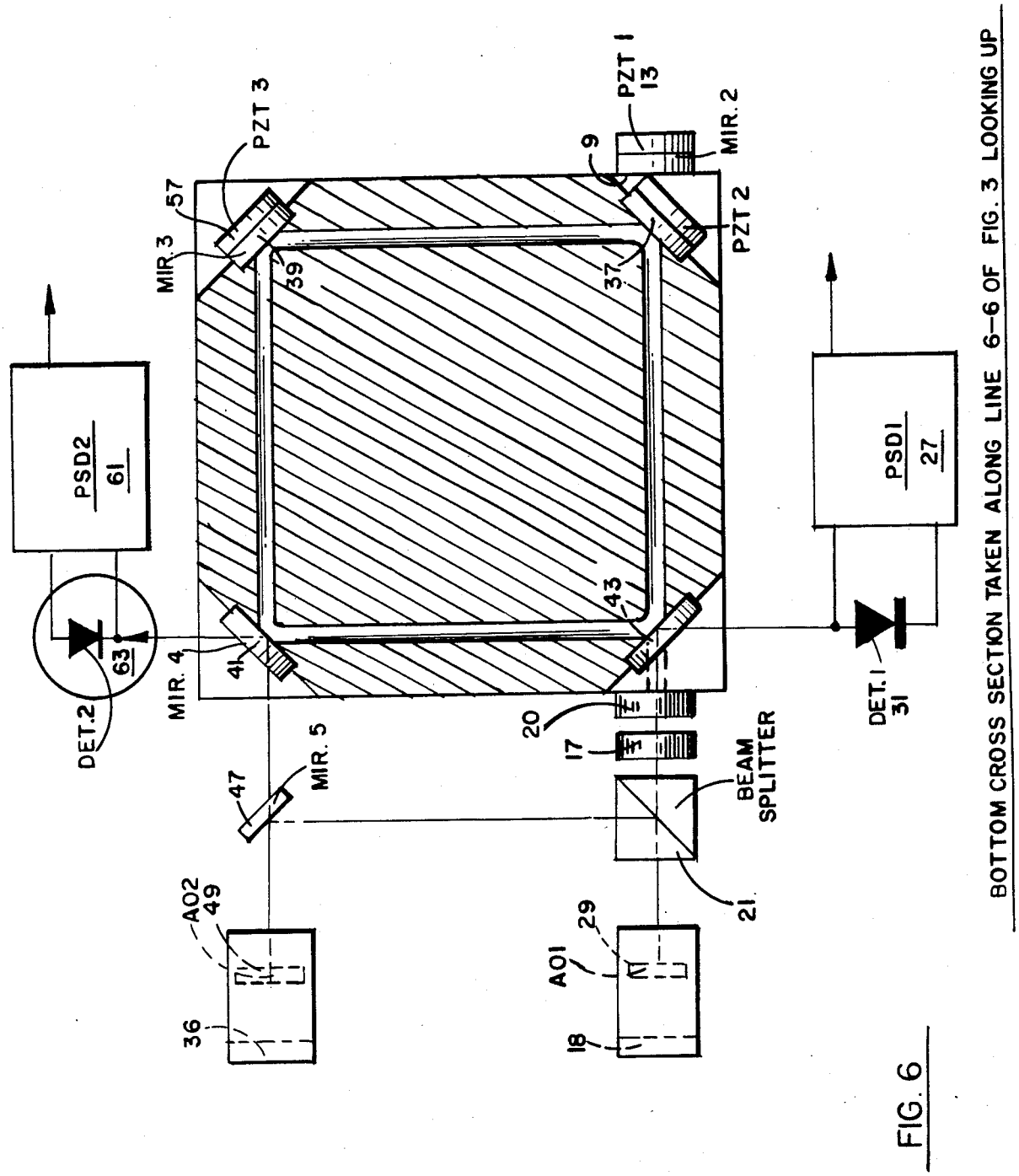
FIG. 6 is a cross sectional view of the phase locked passive ring resonator gyroscope body taken along sectional line 6—6 of FIG. 3 and viewed from the bottom.

FIG. 6 shows the second resonator cavity in section as viewed from the bottom surface to the top of the gyro. The second cavity 16 has first, second, third and fourth evacuated hollow segments, 44, 46, 48, 50. In the case of a triangular cavity (not shown) only three segments would be used. The segments of cavity 16 are coupled at their ends to form a closed planar evacuated path. For example, one end of segment 44 is joined with one end of segment 46 at an intersection where mirror surface 37 is attached to PZT2 35.

In another alternative embodiment of the phase locked passive ring laser gyro 10, the first resonator cavity 15 is positioned and dimensioned in relation to the second resonator cavity 16 to provide partial dimensional change compensation for optical path length changes in response to induced body dimension changes by temperature or external force. Bias errors relating to temperature induced body dimension changes or to changes from external forces applied to said body are cancelled providing a passive ring resonator gyroscope having enhanced stability using only two servos.

Figure 5:
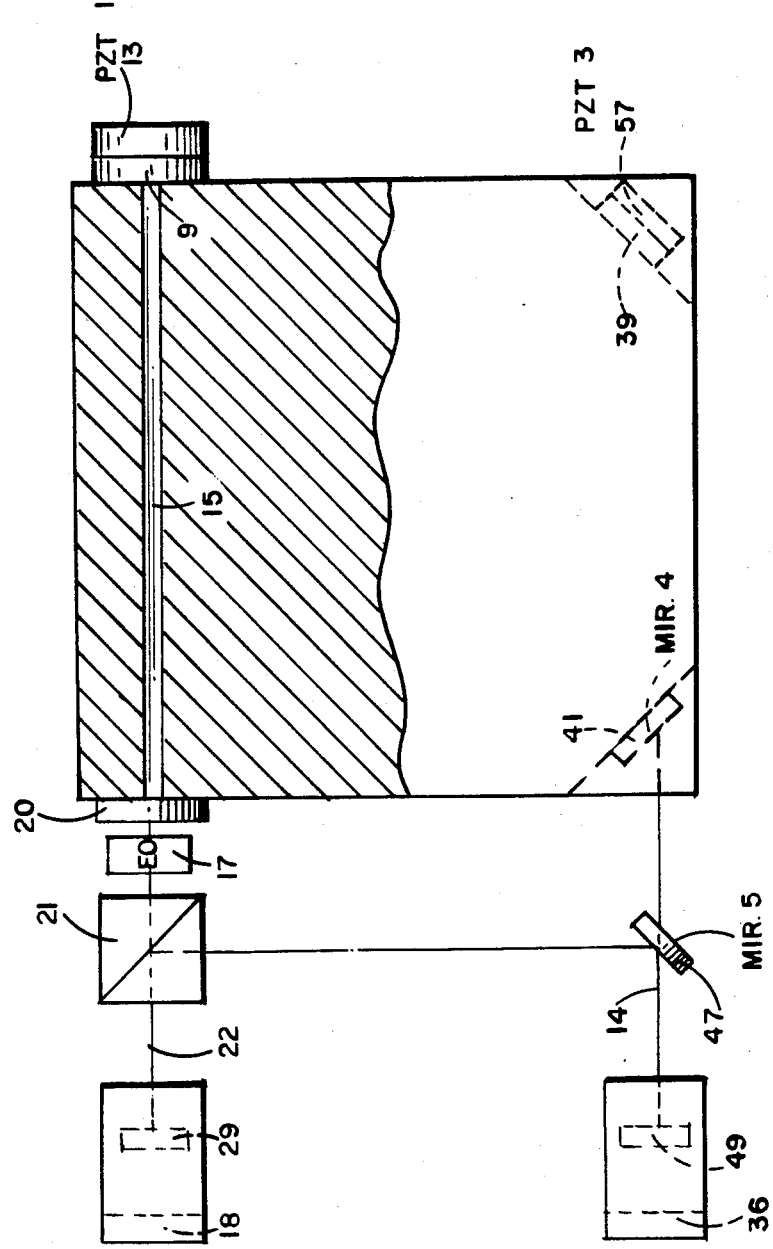
FIG. 5 is a cross sectional view of the phase locked passive ring resonator gyroscope body taken along line 5—5 of FIG. 3.

FIG. 5 shows the first resonator cavity 15 in section. The first resonator cavity has a transmitting optical port means at first cavity port 20 for transmitting stabilized single frequency light F0 and at least two internal body-mounted reflective surfaces such as partially transmissive mirror 20 and mirror surface 9 on piezoelectric transducer PZT1, 13.

An appropriate gain medium, such as a mixture of Helium and Neon, is contained in the first resonator cavity 15 at a pressure in the range of 4 to 10 torr when sealed.

Referring to FIG. 7, block 80 represents a means for exciting the gain medium within said first cavity 15 to induce lasing. This element is also shown in the embodiment of FIG. 1. This element is typically a controllable current source capable of an output voltages determined by the ionization potential of the gas mixture and an output current in the range of one to ten milliamperes.

Although FIGS. 1 and 7 each depict use of straight cavities for the first laser means, the use of an L-shaped laser as the first resonator cavity above, below or in the same plane as the second resonator are anticipated to be alternative embodiments that can offer the promise for dimensional compensation. Additional alternative embodiments include an arrangement in which the first laser means has segments orientated to be transverse to the plane of the second resonator cavity 16.

Optical detector DET1 units (such as first detector 31 and second detector DET2 63 typically contain a reversed biased PIN diode and a low noise preamplifier. A detector such as the SD-00-12-12-231 manufactured by the *Silicon Detector Corp.* of Newbury Park, CA. or the model FND-100 by EG&G Corp. of Wakefield, Mass. is suitable for use with a Helium Neon laser light source.

The first and second detectors 31 and 63 of FIG. 7 are positioned to receive reflected light as detector 1005 does from laser 1001 in FIG. 10a. FIG. 10c shows a response curve having a dip at resonance 1013. This response characteristic corresponds to that for diode 1005 receiving the reflected input beam. The response curves for detectors 31 and 63 dips at resonance because, in the embodiment depicted by FIG. 1 and FIG. 7, these diodes receive reflected light from mirrored surfaces 43 and 41, respectively. At resonance, second cavity 16 absorbs light entering from ports 43 and 41, thereby leaving less light for reflection from the respective mirrored surface. Detector 1009 of FIG. 10b is positioned to receive light from resonator 1007 in accordance with the response characteristic 1011 of FIG. 10b. The relative position of detector 1009 to measure the transmitted light is not used in the embodiment of FIG. 7.

The respective DC AMP (19, 25) is driven by the integrator to apply a signal to the PZT to move the frequency of the respective laser in a direction to increase the response of the signal from the second resonator cavity. As the signal from the DC AMP (19, 25) reaches a value sufficient to peak the tuning of the resonator, the signal out of the low-pass filter goes to zero and the output of the integrator stops changing, leaving the frequency of the affected laser unchanged. A change in the body rate or a change due to induced drift moves the laser off resonance; however the servo responds by shifting the timing voltage to the PZT to re-establish resonance.

OPERATION

Due to the Sagnac effect, the path lengths of the clockwise (CW) and counterclockwise (CCW) beams in ring resonator differ as a function of body rotation rates. Consequently, the resonant frequencies for CW and CCW light in the passive cavity have a corresponding different dependence. The goal of the optics and electronics of the Passive Ring Resonator Gyroscope (PRRG) is to detect the frequency difference that arises between the CW and CCW beams due to inertial rotations. The intent of the single body small source linear phase locked laser/passive cavity design is to eliminate bias errors caused by the resonant frequencies of the linear laser and passive cavity changing with respect to one another. In this integral, single block, or single piece body these bias errors will also be independent of input rotation rates. The two cavities are arranged mechanically and geometrically to insure that shifts in laser frequency arising from body dimensional changes are experienced by both the passive resonator cavity and the linear laser cavity and therefore reduce the effect of such bias errors.

To obtain such bias compensation, the Free Spectral Range of the first resonant cavity 15 is made equal to the Free Spectral Range of the second resonant cavity 16. The Free Spectral Range (F.S.R.)=c/p where c is the speed of light and p is the optical round trip pathlength of a resonator. Thus, the F.S.R. of a square passive ring resonator with sides of length L is c/4L. To meet the F.S.R. requirement, two cases arise contingent upon the linear resonator design. The first resonator forming the laser means is comprised of a mirror with no curvature, i.e. a flat mirror, and a mirror with a predetermined radius of curvature, i.e. a curved mirror, the required resonator length between mirrors is L. The F.S.R. of this flat mirror, curved mirror resonator equals c/4L. However, a resonator using two curved mirrors requires a resonator length between mirrors equal to 2L. This configuration also has a F.S.R. equaling c/4L. With the criteria (F.S.R.)Laser=(F.S.R.)Passive Resonator=c/4L, it is apparent that any change in the F.S.R. of the laser resonator will equal any change in the F.S.R. of the passive ring resonator which may arise from thermal or mechanical changes.

Mirrors with piezoelectric (PZT) backings supply a path length adjusting means to the passive resonator cavity. This adjustment effects both the CW and CCW beams.

Light reflected off the passive second cavity from the CW direction is detected and phase sensitive demodulated by employing a mixer. The error signal drives a piezoelectric backed mirror in the first linear laser to bring it into the CW beam's resonance. In the preferred embodiment, the DC error signal is applied to PZT1 and PZT2. Light reflected off the passive second cavity from the CCW direction is detected and phase sensitive demodulated by employing a mixer amplifier. The error signal drives a VCO which shifts the frequency of the injected CCW beam to bring it into the passive cavity's resonance. In the preferred embodiment, a DC tuning source signal from DC TUNING SOURCE 80 is applied to PZT3 to provide for initial coarse frequency alignment.

Acousto-Optics

The two AO devices are each typically made up of a piezoelectric transducer attached to a crystal. The AO device is fabricated from a piezoelectric crystal material such as quartz, $TeO_2$ (Telurium Dioxide) or $PbMoO_4$ (Lead Molybdate). In the preferred embodiment, the AO1 transducer driven at F1, establishes an acoustic wave at frequency F1 in the crystal. Associated with the acoustic wave is a varying index of refraction due to the compressions and rarefactions of atomic density in the crystal. Incoming light diffracts off this induced grating giving rise to many orders of diffracted beams. The 0th order beam is at the frequency of the single frequency light, (Fo.+Fm). The first order beam has the frequency (Fo+/−Fm)+F1 where F1 is the frequency of the acoustic wave.

The output from the A02 device has the discrete frequencies (Fo+/−Fm)+nF2 where n=0,1,2 . . . each separated in space by an angle proportioned to n. Thus, we see that by shifting the AO F2 wave frequency by 1 Hz, we can add 1 Hz to the frequency of the first order beam exiting the A02 device. Therefore, the AO's operate as frequency shifters in our application. (See e.g., *Optical Waves in Crystals*, A. Yariv & P. Yeh (John Wiley & Sons)

Operation

The Phased Locked ring laser gyroscope shown in FIG. 1 has a first servo control loop and a second servo control loop, each being referenced to OSC1 (oscillator 1) 33. Each servo loop uses light originating from linear laser 15 and modulated by E0 (electro-optic modulator) 17.

Laser 15 provides a relatively coherent light source at frequency F0 to E0 (electro-optic modulator) 17. E0 17 is driven by OSC1, 33 at Fm. Therefore, E0 17 frequency modulates the F0 source at frequency Fm (typically 50 MHz). For small modulation amplitudes, the light source from E0 17, ray 72, has side bands at F0+Fm and at F0−Fm. The modulated laser light source is split by beamsplitter 21 to source a first beam, ray 22, to AO1 (acousto-optic modulator 1) 29 and a second beam, ray 14, to MIR5 (mirror 5) and thence to A02, 49 (acousto-optic modulator 2).

OSC2, (oscillator 2) 45 typically operates at a frequency of 80 MHz and drives A01 29 at frequency F1. The light source having frequency components F0, F0+Fm and F0−Fm passes through A01 29 and is frequency shifted to contain frequency components F0+F1+Fm, F0+F1−Fm and Fo+F1.

The light source from A01 output port 24, is directed to and predominately reflects off of partially transmissive reflector 43. That portion of ray 24 that enters passive cavity 16 circulates as ray 44, ray 46, ray 48 and ray 50 to form the FCW (clockwise) beam in the cavity.

Referring to FIG. 7, the input path to the first servo loop consists of the path of ray 20, through BS1 21, to A01 29, to MIR1 43, to reflected ray 32, and to DET1 31. DET1 31 provides an electrical signal via signal line 34 to the RF input of PSD1 (phase sensitive detector 1) 27. PSD1 27 also receives a signal at frequency Fm at its LO input. PSD1 provides a phase related error signal at its IF output to INTEG (integrator 1) 23.

Each error signal is produced as the instantaneous frequency of the laser is swept past the line bandwidth of the cavity. At that moment, the cavity absorbs the FCW light on MIR1 to produce a dip in the signal to the DET1 31 and subsequently to PSD1 27. PSD1 is a phase sensitive detector referenced to the OSC1 source 33 at frequency Fm and is sensitive only to the Fm signal component within ray 32 to DET1.

VCO 51 typically operates at a variable offset frequency and drives A02 49 at frequency F2. The light source having frequency components F0, F0+Fm and F0−Fm passes through A02 49 and is frequency shifted to contain frequency components F0+F2+Fm, F0+F2−Fm and Fo+F2.

The light source from A02 is directed to and predominately reflects off of partially transmissive reflector 41. That portion of the CCW ray that enters passive cavity 16 circulates as ray 48, ray 46, ray 44 and ray 50 to form the FCCW (counterclockwise) beam in the cavity.

Referring to FIG. 7, the input path to the second servo loop consists of the path of ray 20, through BS1 21, to A02 49, to MIR4 41, to ray 40, and to DET2 63. DET2 63 provides an electrical signal via signal line 64 to the RF input of PSD2 (phase sensitive detector 2) 61. PSD2 61 also receives a signal at frequency Fm at its LO input. PSD2 provides a phase related error signal at its IF output to INTEG2 (integrator 2) 65.

Each error signal is produced as the instantaneous frequency of the laser is swept past the line bandwidth of the cavity. At that moment, the cavity absorbs the FCCW light on MIR4 to produce a dip in the signal to the DET2 3 and subsequently to PSD2 61. PSD2 is a phase sensitive detector referenced to the OSC1 source at frequency Fm and is sensitive only to the Fm signal component within ray 40 to DET2. PSD2 provides a polarized error signal via signal line 56 to the input of integrator INTEG2 65.

Frequency Modulation Stabilization Techniques

Frequency modulation spectroscopic techniques have been recently developed as a means to enhance the signal to noise ratio and obtain finer resolution of weak absorbing lines. In normal phase sensitive detection schemes, the frequency of the input source is dithered or frequency modulated about a small portion (less than the Full Width Half Max, (FWHM) point) of the cavity absorption resonance of interest. Therefore, for a resonance centered at Fo, and a frequency modulation Fm with amplitude "a", the source frequency can be represented as $$F = A*COS(2\pi Fo*t + a*COS\ 2\pi Fm*t)$$

where "a" is the modulation depth (less than the FWHM of the resonance) and "A" is the amplitude of the source. Normally, "a" is small and therefore a Taylor expansion or the equivalent Bessel function expansion for small arguments will give a system response of a DC term and harmonics at 1Fm, 2Fm, 3Fm, etc. For a small "a", the 1Fm term will dominate and phase sensitive detection at Fm will result in a derivative response of the resonance (centered at Fo with FWHM greater than a). This derivative signal has the correct + or − error signal that is readily tractable to a zero seeking servo loop such that at zero signal, the servo is at the peak of the resonance. This frequency stabilization technique works well for most applications but for the utmost in resolution and phase stability, an expanded approach is utilized. Instead of modulating (Fm at depth a) within the FWHM of the resonance, a larger frequency swing (depth) is used to drive the source frequency outside the absorption resonance's FWHM and therefore into the frequency domain where there is little background noise from the resonance signal (large depth a). With higher modulation frequencies Fm (>1 MHz), the system operates out of the 1/f noise and low frequency noise spectrum of the frequency source and in the regime of shot noise limited frequency output of the laser. Accordingly, the source frequency will be $$F = A*COS\ (2\pi TFo*t + a*COS\ 2\pi TFm*t)$$

where "a" is large ("a" at least 10 times greater FWHM), Fo is the center absorption resonance frequency, and Fm is the modulation frequency (Fm>1 MHz). A complete Bessel function expansion of F results in frequencies centered at Fo, Fo+/−nFm where "n" is an integer with amplitudes related to the Bessel functions Jn. For Phase Locked Passive Ring Laser Gyro (PRLG) applications, the modulation depth "a" is picked such that the dominant response is limited to Fo and Fo+/−Fm and all subsequent sidebands are negligible. This frequency modulation process is accomplished by injection of the source Fo into an E0 17 which frequency modulates the light at Fm. In the passive cavity approach Fm is about 10 MHz for a passive cavity having an FWHM of 100 KHz.

As signals Fo, Fo+/−Fm pass through A01 or A02, the three frequencies are upshifted in frequency by F1 or F2, respectively to Fo+F1, Fo+/−Fm+F1, or Fo+F2, Fo+/−Fm+F2. Each of these sets of frequencies are injected into the passive cavity 16 as either the CW or CCW beam. The Phase Locked PRLG of FIG. 1 through FIG. 7 shows an embodiment in which the reflected beam 32 is detected as opposed to the transmitted beam in alternative passive cavity configurations. A dip in the detector signals via signal lines 34, 64 will appear instead of a resonance peak. The fast response detectors 31 or 63 function as beat frequency detectors and also provide signal information with a DC intensity level. The three frequency components (Fo+F1), (Fo+F1+/−Fm) mix with each other to produce a beat frequency at Fm (all other frequencies Fo, Fo+/−F1, etc. are too high in frequency $\approx$(1014 Hz), to be detected by the rest of the detector servo system). Normally, if there is no background or resonance signal, the photocurrents from the beat signals resulting from the two sidebands +Fm and −Fm are opposite in phase and will cancel out at the photodetector. However, where there is a resonance, after phase sensitive demodulation, a quasi-derivative signal as shown in FIG. 11b will result which provides an error signal having a + or − polarity, herein referred to as a DC error signal, utilized in a zero seeking servo loop. By phase sensitive detecting the resulting +Fm and −Fm signals from detectors 31 and 63 using mixer PSD1 or PSD2, the demodulated DC level signals as shown in FIG. 11b are obtained and utilized in the servo loop via the integrators and amplifiers to maintain CW and CCW resonance.

Note that FIG. 11b represents the resulting PSD DC level output amplitude as the source laser Fo is scanned from at least Fo−Fm to F−+Fm. As the source laser is exactly at Fo, the DC level is zero and there is no error correcting signal to the servo loop.

Cavity and AO Servo Operation

The acousto-optic device is an essential element in the output servo loop. Clockwise light is detected and phase sensitive demodulated to produce a DC error signal comparable to that in FIG. 11b resulting from the frequency modulation stabilization technique. This DC signal is the servo error signal which is integrated and then amplified using a high voltage amplifier to the appropriate levels needed to drive the PZT elements of the input source laser and the passive cavity. In this way, the input CW beam is locked to the CW passive cavity's resonance.

The CCW light is detected and phase sensitive demodulated in its corresponding servo loop. PSD2 provides the demodulated CCW error signal on signal line 56 to the input of INTEG2 65 where it is integrated and amplified and fed into a voltage controlled oscillator (VCO) 51. The VCO output frequency is used to change the frequency that A02 shifts the CCW beam such that the frequency of the CCW beam is brought into the cavity's resonance. The input rotation rate to the Phase Locked PRLG sensitive axis is related to the VCO's frequency and is the frequency difference of the frequencies supplied to A01 and A02. This frequency difference is counted using counter 71 to form a digital output signal which is scaled to provide a digital representation of the rotation rate about the sensitive axis.

Common Mode

Two acousto-optic devices are used so each beam encounters similar phase shifts. A02 is driven by the voltage controlled oscillator VCO 51 and shifts the CCW light up in frequency by F2 plus or minus a frequency related to the input rotation rates A01 in the CW beam path is driven by oscillator OSC2 and shifts the CW beam up in frequency by F1. By passing the CW light through an acousto-optic device, common mode bias errors are eliminated with respect to the CCW beam.

Although the invention has been disclosed and illustrated in detail, it is to be clearly understood that the same is by way of illustration as an example only and is not to be taken by way of limitation. The spirit and scope of this invention is to be limited only by the terms of the appended claims.

What is claimed is:

1. A phase locked passive ring resonator gyroscope having enhanced stability and sensitivity comprising:

a fixed frequency reference signal generator to provide a reference signal at a fixed reference frequency (Fm);

a single piece body having integral first and second resonator cavities, said first resonator containing a lasing medium;

a laser means having a power source, using said first resonator cavity, said laser means having a first cavity path length adjusting means (PZT1) responsive to a first control signal for providing a single frequency light source (F0);

means responsive to said single frequency light source and to said reference signal for frequency modulating said single frequency light source to form a frequency modulated light source having a center frequency equal to said single frequency light source (F0) and having respective upper and lower side bands at frequencies Fo+Fm and at F0−Fm, respectively;

means for splitting said frequency modulated light source into respective first and second frequency modulated rays;

means responsive to said first frequency modulated ray for frequency shifting said first frequency modulated ray center frequency by a fixed offset frequency (F1) to form a propagating beam, said propagating beam being coupled into said second resonator cavity to form a propagating light beam;

said second resonator cavity being a passive high Q evacuated cavity having a closed optical path tuned to resonate a substantially the light frequency of said first resonator cavity, the sensitive axis of said passive ring resonator gyroscope being essentially normal to the plane of said closed optical path;

means responsive to said second frequency modulated ray and to a second control signal for frequency shifting said second frequency modulated ray by a variable offset frequency in response to said second control signal to form a counterpropagating beam and for coupling said counterpropagating beam into said second resonator cavity to form a counterpropagating light beam (FCCW);

a detector means optically coupled to sample said propagating light beam for detecting a first phase error signal at reference signal frequency, and being optically coupled to sample said counterpropagating light beam for detecting a second phase error signal at reference signal frequency;

cavity servo means responsive to said reference signal and to said first and second phase error signals from said detector means for providing:

a first control signal to said first cavity path length adjusting means to adjust the resonant frequency of said single frequency light sources (F0) to maintain said propagating light beam (FWC) in said second resonator at peak resonance by driving a phase difference between said detected first phase error signal and the fixed frequency reference signal to a minimum value, and for providing:

a second control signal to said means for frequency shifting said second frequency modulated ray by a variable offset frequency (F2) to control and maintain said counterpropagating light beam (FCCW) at peak resonance by driving a phase difference between said detected second phase error signal and the fixed frequency reference signal to a minimum value;

output counter means for measuring and outputting a frequency difference between said fixed offset frequency and said variable offset frequency, the measured frequency difference representing the difference in frequency due to an input gyro body rate about axis (54) increased by the fixed frequency of the fixed offset frequency (F1).

2. The passive ring resonator gyroscope of claim 1 wherein said laser means further comprises:

a piezoelectric transducer having a mirror surface, said mirrored surface being positioned on said piezoelectric transducer within said integral first cavity to adjust the pathlength of reflected light within said first cavity to adjust the center frequency of said first resonator cavity laser means in response to said first control signal.

3. The passive ring resonator gyroscope of claim 1 wherein said means for splitting said frequency modulated light source further comprises:

a beam splitter having a receiving aperture responsive to light from said frequency modulated light source and first and second transmitting apertures for sourcing said first and second frequency modulated rays.

4. The passive ring resonator gyroscope of claim 1 wherein said means responsive to said first frequency modulated ray for frequency shifting its center frequency by a fixed offset frequency (F1) to form a propagating beam further comprises:

a second reference oscillator for providing a second reference signal at said fixed offset frequency (F1); and an acousto-optic coupler means responsive to said second reference signal for upshifting said first frequency modulated ray by a frequency equal to the frequency of said second reference signal.

5. The passive ring resonator gyroscope of claim 1 wherein said means responsive to said second frequency modulated ray for frequency shifting said second frequency modulated ray in response to a second control signal to form a counterpropagating beam and for coupling said counterpropagating beam into said second resonator cavity further comprises:

a variable frequency oscillator having an input terminal responsive to said second control signal and an output terminal; and, a second acousto-optic coupler having an input terminal coupled to the output terminal of said variable frequency oscillator, said acousto-optic coupler being positioned to receive said second frequency modulated ray and to transmit said counterpropagating beam into said second cavity to form said counterpropagating light beam (FCCW).

6. The phase locked passive ring resonator gyroscope of claim 1 wherein said detector means further comprises:

a first phase detector optically coupled to sample said propagating light beam (FWC), said first phase detector being biased to provide a detected-first-phase error signal at reference signal frequency at an output terminal; and a second phase detector optically coupled to sample said counterpropagating light beam, said second phase detector being biased to provide a detected-second-phase error signal at reference signal frequency at an output terminal.

7. The phase locked passive ring laser gyroscope of claim 6 wherein said cavity servo means of claim 6 responsive to said reference signal and to said first and second detected phase error signals from said detector means further comprises:
  a first phase detector responsive to said first reference signal, said first phase detector having an input terminal coupled to receive said first phase error signal from said first detector for providing a detected-first-phase error signal;
  a first integrator having an input coupled to receive said detected-first-phase error signal and an output terminal for providing a first-integrated output signal;
  first amplifier means having an input coupled to receive said first-integrated output signal for scaling and providing said first control signal; and
  a second phase detector responsive to said second reference signal and having an input terminal coupled to receive said second phase error signal from said second detector and an output terminal for providing a detected-second-phase error signal;
  a second integrator having an input coupled to receive said detected-second-phase error signal and an output terminal for providing a second-integrated output signal; and
  a second amplifier means having an input coupled to receive said second-integrated output signal for scaling and providing said second control signal.

8. The phase locked passive ring resonator gyroscope of claim 7 wherein said second resonator cavity comprises: a dynamic second cavity path length adjusting means responsive to a second integrated output signal for adjusting the path length of said second resonator cavity; wherein said cavity servo means further comprises: a second-resonator path length amplifier having an input coupled to receive said first-integrated output signal from said first integrator output terminal and an output terminal for providing a conditioned first-integrated output signal to said dynamic first cavity path length adjusting means.

9. The phase locked passive ring laser gyroscope of claim 1 wherein said second resonator cavity further comprises:
  first and second partially transmissive and receiving ports;
  said first partially transmissive and receiving port being characterized to receive and pass said propagating beam into said second resonator cavity to form said propagating light beam (FWC);
  said second partially transmissive and receiving optical port being characterized to receive and pass said counterpropagating beam into said second resonator cavity to form said counterpropagating light beam (FCCW) in said second resonator.

10. The phase locked passive ring resonator gyroscope of claim 9 wherein said output counter means further comprises:
  an output counter having first and second input terminals and an output signal means for providing a digital output signal, said first input terminal being coupled to receive said fixed offset frequency signal (F1), and said second input terminal being coupled to receive said variable offset frequency signal (F2), said counter digital output signal characterizing the input gyro body rate.

11. The phase locked passive ring resonator gyroscope of claim 1 wherein said first resonator cavity is positioned transverse to the plane of said second resonator cavity.

12. The phase locked passive ring resonator gyroscope of claim 1 wherein said first and second resonator cavities are positioned in parallel plane relation.

13. The phase locked passive ring resonator gyroscope of claim 1 wherein said first and second resonator cavities are positioned to be coplanar.

14. The phase locked passive ring resonator gyroscope of claim 1 wherein said first resonator cavity is transverse to said second resonator cavity.

15. The phase locked passive ring resonator gyroscope of claim 1 further comprising:
  a prism characterized to receive said first frequency-modulated ray from said means for beamsplitting and directing said first frequency-modulated ray to said means for frequency shifting said first frequency modulated ray center frequency, said prism being further characterized to receive said propagating beam from said means for frequency shifting, and being further characterized to redirect said propagating beam to the plane of said second resonator cavity and redirecting said propagating beam to said second resonator cavity to form said propagating light beam FWC within said second resonator cavity.

16. The phase locked passive ring laser gyro of claim 1, wherein:
  said second resonator cavity is positioned and dimensioned in relation to the first resonator cavity to provide partial dimensional change compensation for optical path length changes in response to said induced body dimension changes;
  whereby, bias errors relating to temperature induced body dimension changes or to changes from external forces applied to said body are cancelled providing a passive ring resonator gyroscope having enhanced stability using only two servos.

17. The phase locked passive ring resonator gyroscope of claim 1 wherein said second resonator cavity further comprises:
  at least first, second and third evacuated hollow segments, the segments being coupled at their ends to form a closed planar evacuated path;
  reflective means for providing a reflective surface at the intersection of each pair of segments to form a closed optical path.

18. A phase locked passive ring resonator gyroscope having enhanced stability and sensitivity comprising:
  a reference signal generator to provide a reference signal at frequency (Fm);
  a body having first and second resonator cavities;
  a laser means having a power source, using said first resonator cavity containing a lasing medium, said laser means having a first cavity path length adjusting means (PZT1) responsive to a first control signal for providing a single frequency light source (F0);
  means responsive to a single frequency light source for forming a frequency modulated light source;
  means for splitting said frequency modulated light source into respective first and second frequency modulated rays;
  means responsive to said first frequency modulated ray for frequency shifting said first frequency modulated ray center frequency by a fixed offset frequency (F1) to form a propagating beam and for coupling said propagating beam into said second resonator cavity to form a propagating light beam (FCW);

said second resonator cavity being a passive high Q evacuated cavity having a closed optical path tuned to resonate at substantially the light frequency of said first resonator cavity;

means responsive to said second frequency modulated ray and to a second control signal for frequency shifting said second frequency modulated ray by a variable offset frequency to form a counterpropagating beam and for coupling said counterpropagating beam into said second resonator cavity to form a counterpropagating light beam FCCW in said second resonator cavity;

a detector means optically coupled to sample said propagating and counterpropagating light beams for detecting first and second phase error signals at reference signal frequency;

cavity servo means responsive to said reference signal and to said first and second phase error signals for providing:

a first control signal to said first cavity path length adjusting means to adjust the resonant frequency of said first single frequency light source (F0) to drive a phase difference between said detected first phase error signal and the fixed frequency reference signal to a minimum value, and for providing:

a second control signal to said means for frequency shifting said second frequency modulated ray by a variable offset frequency (F2) to drive the phase difference between said detected second phase error signal and the fixed frequency reference signal to a minimum value; and output counter means for measuring and outputting a frequency difference between said fixed offset frequency and said variable offset frequency.

* * * * *